(12) United States Patent  
Fujisawa et al.

(10) Patent No.: US 6,407,806 B2
(45) Date of Patent: Jun. 18, 2002

(54) ANGLE COMPENSATION METHOD

(75) Inventors: Satoru Fujisawa; Hisato Ogiso, both of Tsukuba (JP)

(73) Assignee: Agency of Industrial Science & Technology, Ministry of International Trade and Industry, Tokyo (JP)

(*) Notice: Subject to any disclaimer, the term of this patent is extended or adjusted under 35 U.S.C. 154(b) by 0 days.

(21) Appl. No.: 09/749,947

(22) Filed: Dec. 29, 2000

(30) Foreign Application Priority Data

Jan. 26, 2000 (JP) ........................................ 2000-017115

(51) Int. Cl.[7] ..................... G01B 11/26; G01B 1/00; G01C 1/00; G01C 21/06; G01N 21/86; G01V 8/00
(52) U.S. Cl. ............... 356/139.03; 356/138; 356/139.1; 356/150; 250/559.3
(58) Field of Search ............... 356/138–152.3; 702/151–154; 342/75, 80, 174, 359

(56) References Cited

U.S. PATENT DOCUMENTS

| | | | | |
|---|---|---|---|---|
| 4,128,825 A | * | 12/1978 | Madsen | 335/272 |
| 4,213,130 A | * | 7/1980 | Vaessen | 343/16 |
| 4,224,507 A | * | 9/1980 | Gendreu | 235/412 |
| 4,231,533 A | * | 11/1980 | Durig | 244/3.16 |
| 4,499,472 A | * | 2/1985 | Willett | 343/374 |
| 4,524,359 A | * | 6/1985 | Champagne | 343/16 |
| 4,663,631 A | * | 5/1987 | Brilman et al. | 342/422 |
| 4,671,654 A | * | 6/1987 | Miyahara et al. | 356/152 |
| 4,837,577 A | * | 6/1989 | Peregrim et al. | 342/80 |
| 5,142,559 A | * | 8/1992 | Wielopolski et al. | 378/205 |
| 5,192,955 A | * | 3/1993 | Hoang | 342/80 |
| 5,473,424 A | * | 12/1995 | Okumura | 356/139.03 |
| 5,756,987 A | * | 5/1998 | Kamataki | 250/206.2 |
| 5,841,397 A | * | 11/1998 | Hopkins | 342/359 |
| 5,929,983 A | * | 7/1999 | Lu | 356/138 |
| 6,005,512 A | * | 12/1999 | Wong | 342/80 |
| 6,259,519 B1 | * | 7/2001 | Hooker et al. | 356/139.03 |

OTHER PUBLICATIONS

Cooke et al, "Precision Aircraft Tracking System," Proceedings of the seminar on optical tracking systems, SPIE White Sands Chapter, Jan. 18–19, 1971.*

* cited by examiner

Primary Examiner—Thomas H. Tarcza
Assistant Examiner—Brian K Andrea
(74) Attorney, Agent, or Firm—Oblon, Spivak, McClelland, Maier & Neustadt, P.C.

(57) ABSTRACT

An angle compensation method compensates for the angle of the light-receiving surface of a photodiode disposed in an inclination detection device. The light-receiving surface is divided into four parts by an a-axis and a b-axis disposed perpendicular to each other and receives light reflected from an object surface that is an X-Y plane. The inclination detection device seeks the inclination of the object surface from changes in the irradiation position of the light reflected onto the photodiode light-receiving surface. The method includes the steps of fixing the light-receiving surface to a rotary stage that can rotate about a c-axis that passes through an intersection of the a-axis and b-axis and is perpendicular to the a- and b-axes and can rotate about a k-axis that is parallel to a Z axis of the object surface, and rotating the light-receiving surface about the c-axis and k-axis so that, when the light-receiving surface is projected onto the object surface, the a-axis aligns with a Y-axis and the b-axis aligns with an X-axis.

4 Claims, 3 Drawing Sheets

Y
LINE OF INTERSECTION R BETWEEN PHOTODIODE LIGHT-RECEIVING AND X-Y PLANE
X
β

LOCUS OF REFLECTED LIGHT DUE TO INCLINATION δ
(Y-AXIS PROJECTED ON PHOTODIODE LIGHT-RECEIVING SURFACE)

b-AXIS
a-AXIS
β

LOCUS OF REFLECTED LIGHT DUE TO INCLINATION δ
(X-AXIS PROJECTED ON PHOTODIODE LIGHT-RECEIVING SURFACE)

ANGLE COMPENSATION METHOD

BACKGROUND OF THE INVENTION

1. Field of the Invention

This invention relates to an angle compensation method for a photodiode light-receiving surface in an inclination detection device wherein reflected light reflected off an object surface is received on the photodiode light-receiving surface divided into four parts and the inclination of the object surface is sought from changes in the position of irradiation of the reflected light on the photodiode light-receiving surface.

2. Description of the Prior Art

In the prior art, the inclination of the object surface was detected by an optical lever method in a pin-contact-type surface roughness tester, scanning probe microscope (atomic force microscope) or a two-dimensional position sensing detector with laser beam reflection.

FIG. 2 is a sketch for explaining the principle of detection of inclination of an object surface by the known optical lever method. In FIG. 2, the photodiode light-receiving surface D is disposed opposite the object surface P, which is the X-Y plane, and the reflected light L1 when the light beam L is incident on the object surface P is received by the photodiode light-receiving surface D. This photodiode light-receiving surface D comprises light-receiving surfaces D1, D2, D3 and D4 divided into four parts by an a-axis and a b-axis perpendicular to each other, and when the photodiode light-receiving surface D is projected on the object surface P, the position of the photodiode light-receiving surface D is adjusted such that the projected a-axis (projected a-axis below) corresponds with the Y-axis and the projected b-axis (projected b-axis below) corresponds with the X-axis, in which state the inclination of the object surface P is measured.

When the object surface P is rotated about the Y-axis by angle γ, the position of irradiation of the reflected light L1 on the photodiode light-receiving surface D is displaced along the b-axis depending on the amount of change, and when the object surface P is rotated about the X-axis by angle δ, the position of irradiation of the reflected light L1 on the photodiode light-receiving surface D is displaced along the a-axis depending on the amount of change. The light beam L in this case has an appropriate amount of spread, i.e., an appropriate amount of spread that can all be contained on the photodiode light-receiving surface D, and the spread of the beam is adjusted in advanced so that it will irradiate the center of the photodiode light-receiving surface D.

Here, when the object surface P is rotated up by angle γ around the Y-axis by the actuator 16 and the center position of the irradiation of the reflected light L1 moves from the irradiation position M1 on one side toward the irradiation position M2 on the other side, this movement causes the light to become thinner on one side of the a-axis and to become thicker on the other side, and this trend becomes marked as the angle γ becomes larger. That is, the difference A in the amount of light obtained by subtracting the amount of light received on one side of the a-axis (amount of light received on light-receiving surface D2 and light-receiving surface D3) from the amount light received on the other side of the a-axis (amount of light received on light-receiving surface D1 and light-receiving surface D4) is proportional to the angle γ when the angle γ is small, and therefore by detecting the light amount difference A, it is possible to seek the angle γ.

Similarly, when the angle δ is small, the angle δ can be sought by the difference B obtained by subtracting the amount of light received on one side of the b-axis (amount of light received on light-receiving surface D3 and light-receiving surface D4) from the amount of light received on the other side of the b-axis (amount of light received on light-receiving surface D1 and light-receiving surface D2).

However, in the above inclination detection method, agreement of the Y-axis with the projected a-axis and agreement of the X-axis with the projected b-axis are prerequisites for measurement, and if they do not agree, the data accuracy of the light amount differences A and B will be degraded, which will degrade the accuracy of measurement of the inclination of the object surface P. Next, degradation of the data accuracy of the light amount differences A and B is discussed using FIG. 3 through FIG. 6.

Degradation of the data accuracy of the light amount differences A and B can occur in the following two modes:

(I) When the photodiode light-receiving surface D is rotated about the c-axis, which passes through the intersection of the a-axis and the b-axis and is perpendicular to the a- and b-axes.

(II) When the photodiode light-receiving surface D is rotated about the Z1-axis, assuming this Z1-axis is parallel to the Z-axis of the object surface and is positioned behind the photodiode light-receiving surface D.

In the case of the mode in (I) above, as shown in FIG. 3, the a-axis projected on the X-Y plane (projected a-axis) is rotated about the Z-axis by angle α with respect to the Y-axis. If the object plane P is inclined by angle δ in this mode, the irradiation of the reflected light L1 on the photodiode light-receiving surface D generates a locus on the Y-axis (axis inclined by angle α from the a-axis) projected on the photodiode light-receiving surface D as shown in FIG. 4. Also, when the object surface P is inclined by angle γ, the irradiation of the reflected light L1 on the photodiode light-receiving surface D generates a locus on the X-axis (axis inclined by angle α from the b-axis) projected on the photodiode light-receiving surface D as shown in FIG. 4.

Therefore, the light amount difference A on both sides of the a-axis is primarily proportional only to angle γ and is therefore described by A=m·γ (where, m is the compensation factor), but due to the occurrence of angle α (rotational shift around the c-axis of the photodiode light-receiving surface D), it is now described by equation (1).

$$A = m \cdot (\gamma \cdot \cos \alpha + \delta \cdot \sin \alpha) \qquad \text{Equation (1)}$$

Further, the light amount difference B on both sides of the a-axis is primarily proportional only to angle δ and is therefore described by B=n·δ (where, n is the compensation factor), but due to the occurrence of angle α (rotational shift around the c-axis of the photodiode light-receiving surface D), it is now described by equation (2).

$$B = n \cdot (\gamma \cdot \cos \alpha + \delta \cdot \sin \alpha) \qquad \text{Equation (2)}$$

In this way, the factor sin α interferes with the light amount differences A and B, and due to this factor, the data accuracy of the light amount differences A and B is degraded.

In the case of the mode in (II) above, as shown in FIG. 5, the line of intersection R between the X-Y plane and the photodiode light-receiving surface D is rotated about the Z-axis by angle β with respect to the Z-axis. If the object plane P is inclined by angle δ in this mode, the irradiation of the reflected light L1 on the photodiode light-receiving surface D generates a locus on the Y-axis (axis inclined by angle β from the a-axis) projected on the photodiode light-receiving surface D as shown in FIG. 6. Also, when the object surface P is inclined by angle γ, the irradiation of the reflected light L1 on the photodiode light-receiving surface D generates a locus on the X-axis (axis inclined by angle β from the b-axis) on the photodiode light-receiving surface D as shown in FIG. 6.

Therefore, the light amount difference A is primarily proportional only to angle γ and is therefore described by A=m·γ (where, m is the compensation factor), but due to the occurrence of angle β (rotational shift around the Z1-axis of the photodiode light-receiving surface D), it is now described by equation (3).

$$A = m \cdot (\gamma \cdot \cos \beta + \delta \cdot \sin \beta) \quad \text{Equation (3)}$$

Further, the light amount difference B is primarily proportional only to angle δ and is therefore described by B=n·δ (where, n is the compensation factor), but due to the occurrence of angle β (rotational shift around the Z1-axis of the photodiode light-receiving surface D), it is now described by equation (4).

$$B = n \cdot (\delta \cdot \cos \beta + \gamma \cdot \sin \beta) \quad \text{Equation (4)}$$

In this way, the factor sin β interferes with the light amount differences A and B, and due to this factor, the data accuracy of the light amount differences A and B is degraded.

As explained above, it is possible to raise the data accuracy of the light amount differences A and B by deleting the interfering terms sin α and sin β, which is equivalent to adjusting the posture of photodiode light-receiving surface D to make both angle α and angle β zero.

However, in adjusting the position of the photodiode light-receiving surface D as explained above, the adjustment that makes angle β zero (adjustment about the Z1-axis) has not been performed at all, and this becomes a factor that can degrade the measurement accuracy of the inclination of the object surface P.

Further, the adjustment that makes the angle α zero (adjustment about the c-axis) has been performed, but this adjustment is based mainly on the experience of the person performing the measurement, and therefore it cannot be said to be a highly accurate adjustment and may be factor in further degrading the measurement accuracy of the inclination of the object surface P.

This invention was proposed to address these issues, and its purpose is to offer an angle compensation method capable of improving the measurement accuracy of the inclination of an object surface in an inclination detection device.

SUMMARY OF THE INVENTION

In order to achieve the above purpose, this invention provides an angle compensation method for compensating for an angle of a light-receiving surface of a photodiode disposed in an inclination detection device, the light-receiving surface being divided into four parts by an a-axis and a b-axis disposed perpendicular to each other and receiving light reflected from an object surface that is an X-Y plane, the inclination detection device seeking an inclination of the object surface from changes in an irradiation position of the light reflected on the photodiode light-receiving surface, the method comprising the steps of fixing the light-receiving surface to a rotary stage that can rotate both about a c-axis that passes through an intersection of the a-axis and b-axis and is perpendicular to the a- and b-axes and about a k-axis that is parallel to a Z axis of the object surface; and rotating the light-receiving surface about the c-axis and k-axis so that, when the light-receiving surface is projected onto the object surface, the a-axis aligns with a Y-axis and the b-axis aligns with an X-axis.

The light-receiving surface can be fixed to a rotary mechanism about the k-axis supported on a rotary mechanism about the c-axis or to the rotary mechanism about the c-axis supported on the rotary mechanism about the k-axis.

Further, the rotary stage comprises a spherical magnetic substance and is housed in a sphere holder having three perpendicular walls, and the sphere is pulled by magnets disposed in the corners formed by the three walls to facilitate rotation of the sphere.

As described above, in this invention the light-receiving surface is fixed to the rotary stage, and the rotary stage is rotated about the c-axis and about the k-axis to eliminate any rotational shift of the light-receiving surface with respect to the object surface. Therefore, the projected a-axis aligns with the Y-axis and the projected b-axis aligns with the X-axis. This can facilitate prevention of degradation of the data accuracy of the light amount differences A and B, and greatly improve the measurement accuracy of the inclination of the object surface.

Further, since the rotary stage is preferably a magnetic sphere as described above and the sphere is pulled toward the corners by magnets while being held in the sphere holder, the sphere can be held stable and angle compensation of the photodiode light-receiving surface can be performed precisely.

Other purposes and features of the invention are described in detail below based on the attached drawings.

DESCRIPTION OF THE PREFERRED EMBODIMENT

The embodiments of the invention are explained below based on the drawings.

Figure 1:
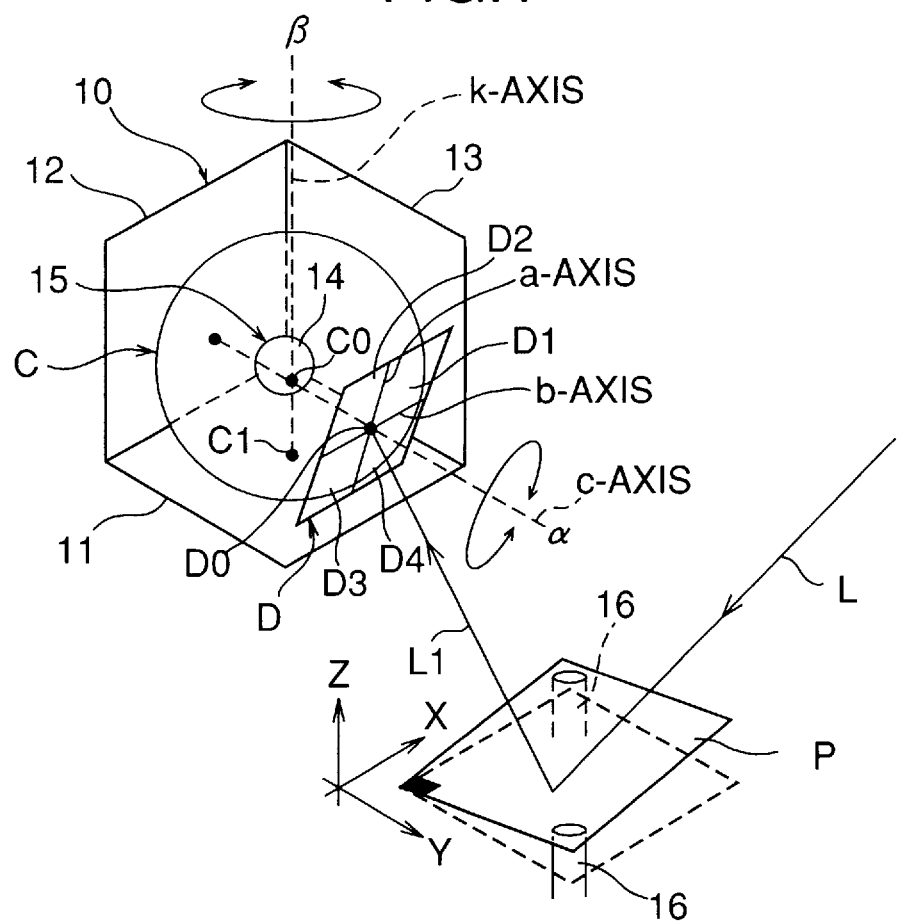
FIG. 1 is an explanatory diagram of the inclination detection device for implementing the angle compensation method of this invention.
Figure 2:
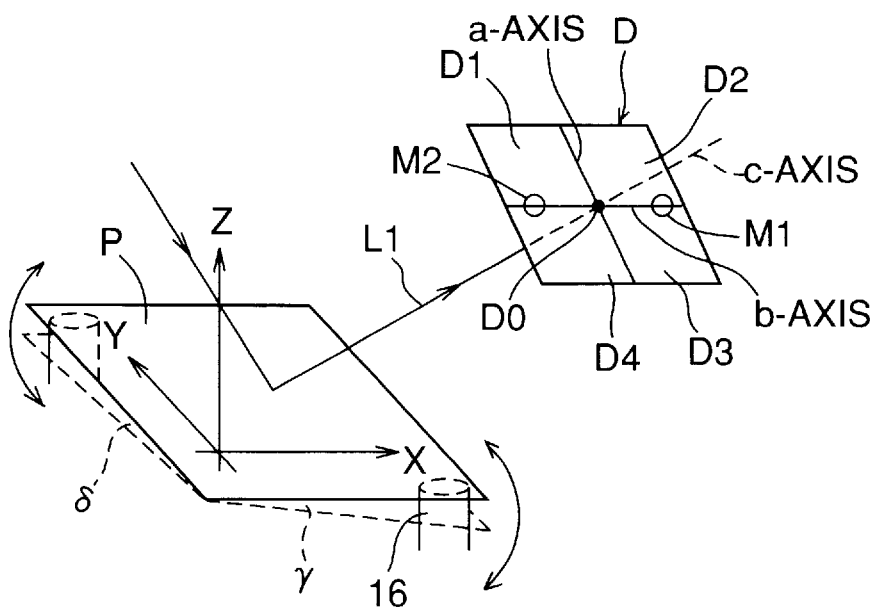
FIG. 2 is a diagram for explaining the principle of inclination detection of the object surface by the known optical-lever method.
Figure 3:
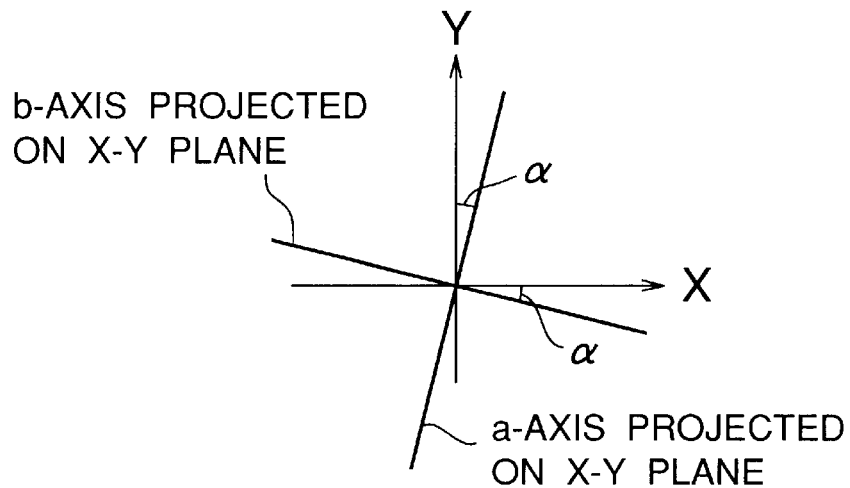
FIG. 3 is a diagram showing the relationship between the X- and Y-axes and the projected a-axis and projected b-axis when the photodiode light-receiving surface is rotated about the c-axis.
Figure 4:
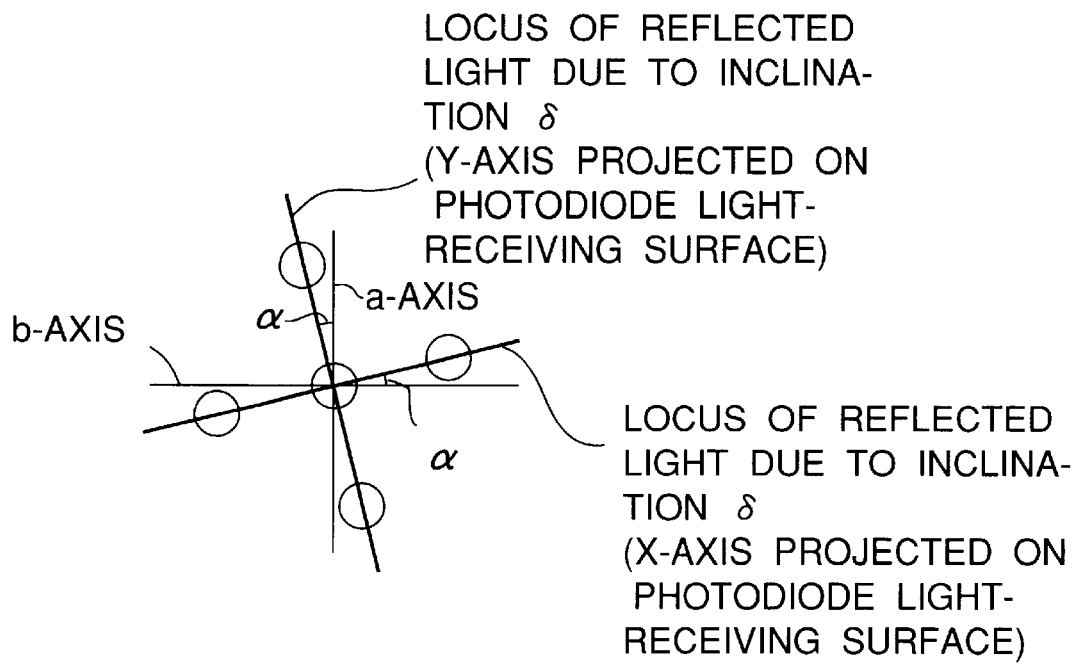
FIG. 4 is a sketch showing the change in the irradiation position on the photodiode light-receiving surface when the photodiode light-receiving surface is rotated about the c-axis.
Figure 5:
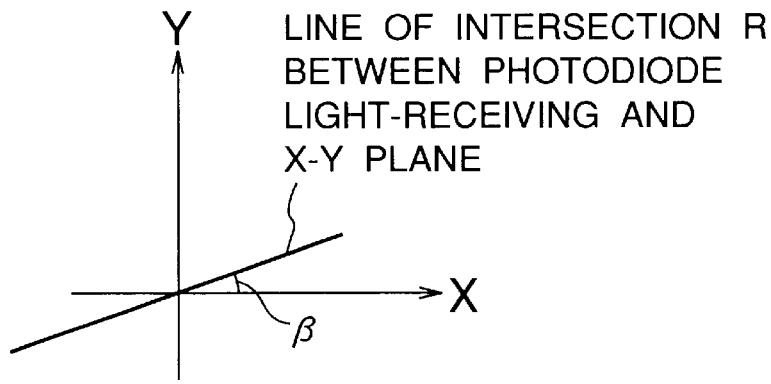
FIG. 5 is a diagram showing the line of intersection with the photodiode light-receiving surface in the X-Y plane when the photodiode light-receiving surface is rotated about the Z1-axis.
Figure 6:
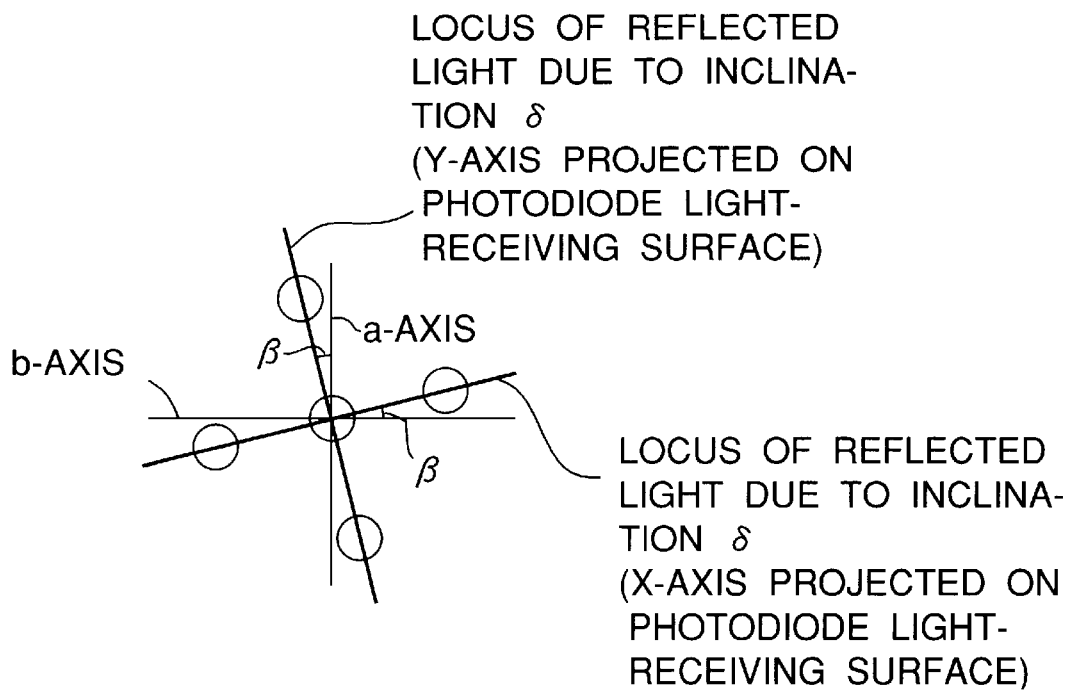
FIG. 6 is a diagram showing the change in the position of irradiation on the photodiode light-receiving surface when the photodiode light-receiving surface is rotated about the Z1-axis.

FIG. 1 is an explanatory diagram of the inclination detection device for implementing the angle compensation method of this invention. In the figure, the inclination detection device comprises a sphere C that is an example of a rotary stage, a photodiode light-receiving surface D fixed to this sphere C, and an object surface P, which is the X-Y plane.

The object surface P and photodiode light-receiving surface D are disposed such that the reflected L1 resulting when the light beam L is incident on the object surface P is received by the photodiode light-receiving surface D. The photodiode light-receiving surface D comprises the four light-receiving surfaces D1, D2, D3 and D4 divided up by the a-axis and b-axis which are perpendicular to each other, these light-receiving surfaces D1, D2, D3 and D4 are connected to an arithmetic unit (not shown in figure), and the amount of light detected by each of the light-receiving surfaces D1, D2, D3 and D4 becomes an electric signal that is input to the arithmetic unit. The arithmetic unit uses the light amount signal to seek the light amount differences A and B described above, and based on these light amount differences A and B, the inclination (angle $\gamma$ and angle $\delta$) of the object surface P is sought.

This object surface P is mounted on an actuator 16 for inclining the object surface P, and this actuator is configured such that it can generate angles $\gamma$ and $\delta$ independently.

The aforementioned sphere C is made from magnetic metal and is housed in a sphere holder 10 having three walls 11, 12 and 13 intersecting each other. Magnets 15 are disposed in the corners 14 formed by the three walls 11, 12 and 13, and the sphere C housed in this sphere holder 10 is pulled toward the corners 14 by the magnets 15 and is held stationary by being in contact with the three walls 11, 12 and 13.

The photodiode light-receiving surface D is fixed to the sphere C as described above, in which case the c-axis, which passes through the intersection Do of the a-axis and b-axis and is perpendicular to the a-axis and b-axis, is disposed such that it passes through the center Co of the sphere C, and the intersection Do area is in contact with the sphere C and is fixed to the sphere C by an adhesive, etc.

The sphere C has a k-axis. This k-axis is formed by linking the contact point C1 between the sphere C and the wall 11, which makes up the bottom surface of the sphere holder 10, and the center Co of the sphere C and is parallel to the Z-axis (axis perpendicular to the X-Y plane) of the object surface P.

In order to make the angle $\alpha$ (rotational shift of the photodiode light-receiving surface D around the c-axis) zero in this configuration, first the actuator on which the object surface P is mounted is moved to incline the object surface P from the prescribed position by only angle $\delta 0$ (or $\gamma 0$) with respect to the angle $\delta$ (or $\gamma$), and the change in the light amount difference A (or B) is sought. Next, the sphere C is rotated about the c-axis by only a small angle, and then the above procedure is repeated in this condition to seek the light amount difference A (or B). In this way, the sphere C is sequentially rotated about the c-axis and the position of the photodiode light-receiving surface D that yields the minimum light amount difference A (or B) is sought. Further, when the light amount difference A (or B) is minimized, the angle $\alpha$ is zero and any rotational shift of the photodiode light-receiving surface D around the c-axis is minimized.

Following this, in order to make angle $\beta$ (rotational shift of the photodiode light-receiving surface D about the k-axis) zero, first the actuator on which the object surface P is mounted is moved to incline the object surface P from the prescribed position by a fixed angle $\delta 0$ (or $\gamma 0$) with respect to the angle $\delta$ (or $\delta \gamma$) and the change in the light amount difference A (or B) is sought as in the case of the adjustment of the angle $\alpha$ described above. Next, the sphere C is rotated about the k-axis by only a small angle, and then the above procedure is repeated in this condition to seek the light amount difference A (or B). In this way, the sphere C is sequentially rotated about the k-axis to seek the position of the photodiode light-receiving surface D at which the light amount difference A (or B) is smallest. Further, when the light amount difference A (or B) has been minimized, the angle $\beta$ becomes zero and the rotational shift of the photodiode light-receiving surface D about the k-axis is eliminated.

Upon completion of adjustment of the angle $\alpha$ and angle $\beta$, the projected a-axis agrees with the Y-axis and the projected b-axis agrees with the X-axis.

The rotation of the aforementioned sphere C about the c-axis and k-axis can be performed by means of an actuator, or a more simple manual operation can be used.

The light-receiving surface can be fixed to a rotary mechanism about the k-axis supported on a rotary mechanism about the c-axis or to the rotary mechanism about the c-axis supported on the rotary mechanism about the k-axis.

As described above, this invention comprises the above configuration, and therefore the effects described below can be expected.

That is, in this invention, the photodiode light-receiving surface is fixed to a rotary stage and this rotary stage is rotated about the c-axis and k-axis to eliminate any rotational shift of the photodiode light-receiving surface with respect to the object surface, and therefore the projected a-axis aligns with the Y-axis and the projected b-axis aligns with the X-axis, thus making it possible to prevent degradation of the data accuracy of the light amount differences A and B due to interference. This makes it possible to greatly improve the accuracy of measurement of the inclination of the object surface in a contact type surface roughness meter or scanning probe microscope (atomic force microscope).

Further, since angle compensation of the photodiode light-receiving surface is performed by rotating this sphere, angle compensation can be performed accurately using a simple configuration.

In addition, since the aforementioned sphere is held in a sphere holder and is pulled toward the corners by magnets, the sphere can be held in a stable condition, which also makes it possible to perform accurate angle compensation of the photodiode light-receiving surface.

What is claimed is:

1. An angle compensation method for compensating for an angle of a light-receiving surface of a photodiode disposed in an inclination detection device, said light-receiving surface being divided into four parts by an a-axis and a b-axis disposed perpendicular to each other and receiving light reflected from an object surface that is an X-Y plane, said inclination detection device seeking an inclination of the object surface from changes in an irradiation position of the light reflected on the photodiode light-receiving surface, said method comprising the steps of fixing the light-receiving surface to a rotary stage that can rotate both about a c-axis that passes through an intersection of the a-axis and b-axis and is perpendicular to the a- and b-axes and about a k-axis that is parallel to a Z axis of the object surface; and rotating the light-receiving surface about the c-axis and k-axis so that, when the light-receiving surface is projected onto the object surface, the a-axis aligns with a Y-axis and the b-axis aligns with an X-axis.

2. The angle compensation method according to claim 1, wherein the light-receiving surface is fixed to a rotary mechanism about the k-axis supported on a rotary mechanism about the c-axis.

3. The angle compensation method according to claim 1, wherein the light-receiving surface is fixed to a rotary mechanism about the c-axis supported on a rotary mechanism about the k-axis.

4. The angle compensation method according to claim 1, wherein the rotary stage comprises a magnetic sphere and is housed in a sphere holder having three perpendicular walls, and the sphere is pulled by magnets disposed in corners formed by the three walls to facilitate rotation of the sphere.

* * * * *